(12) United States Patent
Wilby

(10) Patent No.: US 11,450,304 B2
(45) Date of Patent: Sep. 20, 2022

(54) ACTIVE TOWED ARRAY SURFACE NOISE CANCELLATION USING A TRIPLET CARDIOID

(71) Applicant: Raytheon Company, Waltham, MA (US)

(72) Inventor: Andrew Wilby, Warwick, RI (US)

(73) Assignee: Raytheon Company, Waltham, MA (US)

( * ) Notice: Subject to any disclaimer, the term of this patent is extended or adjusted under 35 U.S.C. 154(b) by 352 days.

(21) Appl. No.: 16/806,990

(22) Filed: Mar. 2, 2020

(65) Prior Publication Data

US 2021/0272547 A1 Sep. 2, 2021

(51) Int. Cl.
| G10K 11/178 | (2006.01) |
| G01S 3/808 | (2006.01) |
| G01V 1/38 | (2006.01) |
| H04R 3/00 | (2006.01) |

(52) U.S. Cl.
CPC ...... *G10K 11/17823* (2018.01); *G01S 3/8083* (2013.01); *G01V 1/3808* (2013.01); *G10K 11/17873* (2018.01); *H04R 3/005* (2013.01); *G01V 2210/32* (2013.01); *H04R 2201/401* (2013.01)

(58) Field of Classification Search
CPC ........ G10K 11/17823; G10K 11/17873; H04R 3/005; H04R 2201/401; G01S 3/8083; G01V 1/3808; G01V 2210/32
USPC ................. 702/17; 381/56, 58, 91, 122, 124
See application file for complete search history.

(56) References Cited

U.S. PATENT DOCUMENTS

| 4,310,904 A | 1/1982 | Ballard et al. |
| 4,536,887 A * | 8/1985 | Kaneda ................. H04R 3/005 381/94.1 |
| H1171 H | 4/1993 | Fillhart et al. |
| 5,220,537 A | 6/1993 | Sullivan |
| 5,771,202 A * | 6/1998 | Bale ..................... G01V 1/3808 367/19 |
| 6,108,270 A | 8/2000 | DePoy, II |

(Continued)

FOREIGN PATENT DOCUMENTS

| EP | 2 312 573 A2 | 4/2011 | |
| WO | WO-2015157084 A1 * | 10/2015 | ............. G01V 1/282 |
| WO | WO 2017/132539 A1 | 8/2017 | |

OTHER PUBLICATIONS

International Search Report for corresponding International Application No. PCT/US2021/014724, filed Jan. 22, 2021, International Search Report dated May 7, 2021 and dated May 21, 2021 (4 pgs.).

(Continued)

*Primary Examiner* — William A Jerez Lora
(74) *Attorney, Agent, or Firm* — Lewis Roca Rothgerber Christie LLP

(57) ABSTRACT

A sensor system includes a triplet element including a first hydrophone, a second hydrophone, and a third hydrophone configured to receive an incoming signal at a first phase, a second phase, and a third phase, respectively, the first to third hydrophones extending along a first direction, and a processor configured to determine an incidence direction of the incoming signal, and to dynamically generate a cardioid null in the incidence direction to reject the incoming signal based on the incoming signal at the first to third phases.

18 Claims, 7 Drawing Sheets

(56) References Cited

U.S. PATENT DOCUMENTS

| | | | |
|---|---|---|---|
| 7,924,654 B1* | 4/2011 | Stottlemyer | G01S 3/8083 367/119 |
| 8,659,976 B2 | 2/2014 | Cotterill | |
| 2009/0257312 A1* | 10/2009 | Novick | G01S 3/86 367/119 |
| 2011/0085421 A1* | 4/2011 | Cotterill | G01S 3/86 367/138 |
| 2012/0093344 A1 | 4/2012 | Sun et al. | |

OTHER PUBLICATIONS

Written Opinion of the International Searching Authority for corresponding International Application No. PCT/US2021/014724, filed May 22, 2021, Written Opinion of the International Searching Authority dated May 21, 2021 (6 pgs.).

Haralabus, G., et al., Unambiguous triplet arrary beamforming and calibration algorithms to facilitate an environmentally adaptive active sonar concept, IEEE, 2006, 7 pages.

Barbagelata et al., Thirty Years of Towed Arrays at Nurc, Oceanography, vol. 21, No. 2, 2008.

Cox, H., et al., Adaptive Cardioid Processing, IEEE, 1992, 4 pages.

* cited by examiner

ACTIVE TOWED ARRAY SURFACE NOISE CANCELLATION USING A TRIPLET CARDIOID

FIELD

Aspects of the present disclosure relate to a system and method for sonar detection.

BACKGROUND

Sonar or sound navigation ranging is a technique for the detection of objects under water and for measuring the water's depth by emitting sound pulses and detecting or measuring their return after being reflected. Passive sonar consists of listening for the sound made by vessels, while active sonar includes emitting pulses of sound (e.g., by a using an acoustic transponder) and listening for echoes.

One application for sonar technology is deep ocean observation (e.g., seabed imaging and mapping). Performing observations near the surface are difficult because of interference from surface reflections. Thus, currently, deep ocean observation is performed by systems near the sea bed. One such solution is a tow vehicle equipped with sonar that is towed behind a ship or vessel. The tow vehicle transmits pulsed signals (e.g., pulsed acoustic signals) that are reflected back from the bottom and objects on the seafloor. The tow vehicle has sensitive receivers (e.g., hydrophones) that receive the returning sound. The signals are then processed to generate an image based on the strength of the returned sound over the area the tow vehicle was sending the sound. However, the long tow lines produce a lot of drag that lifts the tow platform away from the seabed, meaning that towed operations in deep water may only be conducted at slow tow speeds. Another solution is the use of battery-powered autonomous unmanned vehicles (AUVs), which can travel faster. However, the batteries on such devices have limited capacity and much energy is expended getting down to and back from the sea floor, which reduces the range of such AUVs. Furthermore, the proximity to the sea floor also limits the effective area of coverage. Therefore, the area coverage rate of existing deep ocean observation systems is small, especially when compared to the vastness of the ocean.

What is desired is a solutions that provides an improved capability for search and protection of the seabed and seabed infrastructure.

The above information disclosed in this Background section is only for enhancement of understanding of the background of the disclosure and therefore it may contain information that does not constitute prior art.

SUMMARY

Aspects of example embodiments of the present disclosure are directed to a submerged sensing system capable of cancelling or substantially reducing surface noise using a triplet cardioid. In some embodiments, the submerged sensing system includes an active towed array of hydrophone triplets capable of forming a cardioid null in a desired direction. The submerged sensing system may predict the incoming angle of unwanted surface return and reject it by pointing the cardioid null in that direction. The triplet element may steer the cardioid null in the direction of surface pulse reflection by adjusting one or more complex weights based on knowledge of the geometry of the tow, water depth, tow depth, etc.

According to some embodiments of the present disclosure, there is provided a sensor system including: a triplet element including a first hydrophone, a second hydrophone, and a third hydrophone configured to receive an incoming signal at a first phase, a second phase, and a third phase, respectively, the first to third hydrophones extending along a first direction; and a processor configured to determine an incidence direction of the incoming signal, and to dynamically generate a cardioid null in the incidence direction to reject the incoming signal based on the incoming signal at the first to third phases.

In some embodiments, the processor is configured to receive, without nullifying, other signals from directions different from the incidence direction of the incoming signal, the other signals being received by the triplet element at a same time as the incoming signal.

In some embodiments, the first phase is different from the second phase.

In some embodiments, the incoming signal is a surface reflection of an acoustic signal off of a seabed.

In some embodiments, one end of each of the hydrophones is positioned along a circumference of a circle.

In some embodiments, the first to third hydrophones are spaced at equal intervals.

In some embodiments, a radius of the circle is less than or equal to ⅙ of a wavelength of the incoming signal.

In some embodiments, the processor is configured to determine an incidence direction of the incoming signal based on a depth of the triplet element, a water column depth, a timing of transmission of a signal being reflected back from a seabed and a water surface as the incoming signal.

In some embodiments, the processor is configured to determine a first incidence direction of the incoming signal at a first time, to determine a second incidence direction of the incoming signal at a second time, and to steer the cardioid null from the first incidence direction to the second incidence direction to reject the incoming signal over time.

In some embodiments, the processor is further configured to calculate an output response of the sensor system as a weighted summation of intensities of signals received at the first to third hydrophones, wherein weights of the weighted summation are based on a radius of the triplet element and an angular location of the cardioid null generated by the sensor system.

In some embodiments, the processor is further configured to calculate an output response of the sensor system as:

$$\text{Output}(\theta) := 20 \cdot \log \left\| \sum_{n=1}^{3} \left[ \text{Phasor}(X_n, Y_n, \theta) \cdot \alpha_n \cdot e^{\frac{-2\pi \cdot i}{\lambda}(c\tau_n)} \right] \right\|$$

where $\theta$ represents an incidence angle of the incoming signal, Phasor represents a signal seen by each of the hydrophones, $X_n$ and $Y_n$ represent coordinates of each of the hydrophones of the triplet element in a cross-plane orthogonal to the first direction, and $$\alpha_n \cdot e^{\frac{-2\pi \cdot i}{\lambda}(c\tau_n)}$$

represents a null-rotating term for steering the null in a particular direction.

In some embodiments, the Phasor is expressed by:

$$\text{Phasor}(x, y, \theta) := e^{\frac{2\cdot\pi\cdot i}{\lambda}\cdot[(x\cdot\cos(\theta))+(y\cdot\sin(\theta))]}$$

where x and y represent coordinates of a corresponding one of the hydrophones and λ represents a speed of sound at a water depth of the triplet element.

In some embodiments, in the null-rotating term, $$\alpha_n \cdot e^{\frac{-2\cdot\pi\cdot i}{\lambda}\cdot(c\tau_n)},$$

$\alpha_n$ and $c\tau_n$ are based on an angular location of a null generated by the sensor system, and λ represents the speed of sound at a water depth of the triplet element.

According to some embodiments of the present disclosure, there is provided a sensor system including: a plurality of triplet elements coupled together along a first direction, a triplet element of the plurality of triplet elements including a first hydrophone, a second hydrophone, and a third hydrophone configured to receive an incoming signal at a first phase, a second phase, and a third phase, respectively, the first to third hydrophones extending along a first direction; and a processor configured to determine an incidence direction of the incoming signal, and to dynamically generate a cardioid null in the incidence direction to reject the incoming signal based on the incoming signal at the first to third phases.

In some embodiments, the sensor system is configured to be towed by a tow body at a particular depth below a water surface, the tow body being towed by a surface vehicle.

In some embodiments, the tow body includes a transmitter configured to generate a pulsed acoustic signal emitted from sides of the tow body, and wherein the incoming signal is a reflection of the pulsed acoustic signal from a seabed and a water surface as the incoming signal.

In some embodiments, the first to third hydrophones are spaced at equal intervals.

In some embodiments, a radius of the triplet element is less than or equal to ⅙ of a wavelength of the incoming signal.

In some embodiments, the processor is configured to determine an incidence direction of the incoming signal based on a depth of the triplet element, a water column depth, a timing of transmission of a signal being reflected back from a seabed and a water surface as the incoming signal.

In some embodiments, the processor is configured to determine a first incidence direction of the incoming signal at a first time, to determine a second incidence direction of the incoming signal at a second time, and to steer the cardioid null from the first incidence direction to the second incidence direction to reject the incoming signal over time.

BRIEF DESCRIPTION OF THE DRAWINGS

These and other features of some example embodiments of the present disclosure will be appreciated and understood with reference to the specification, claims, and appended drawings, wherein:

DETAILED DESCRIPTION

The detailed description set forth below in connection with the appended drawings is intended as a description of some example embodiments of a system and a method for mitigating the effects of compression errors provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Aspects of example embodiments of the present disclosure are directed to a submerged sonar-based sensing system that is capable of rejecting (or substantially reducing the received intensity of) the surface-reflected signals (i.e., sound waves reflected from the water surface). The sonar-based sensing system may be a submerged, low-frequency, active-sonar system, which may be able to image the seabed and/or submerged objects. If not canceled, the surface reflection noise can interfere with the desired signal receive from the depth and can lower signal-to-noise ratio (SNR) and imaging resolution. According to some embodiments, the sonar-based system uses a triplet hydrophone that allows a dynamic cardioid null to be steered towards this interference, thus significantly improving image SNR.

Figure 1:
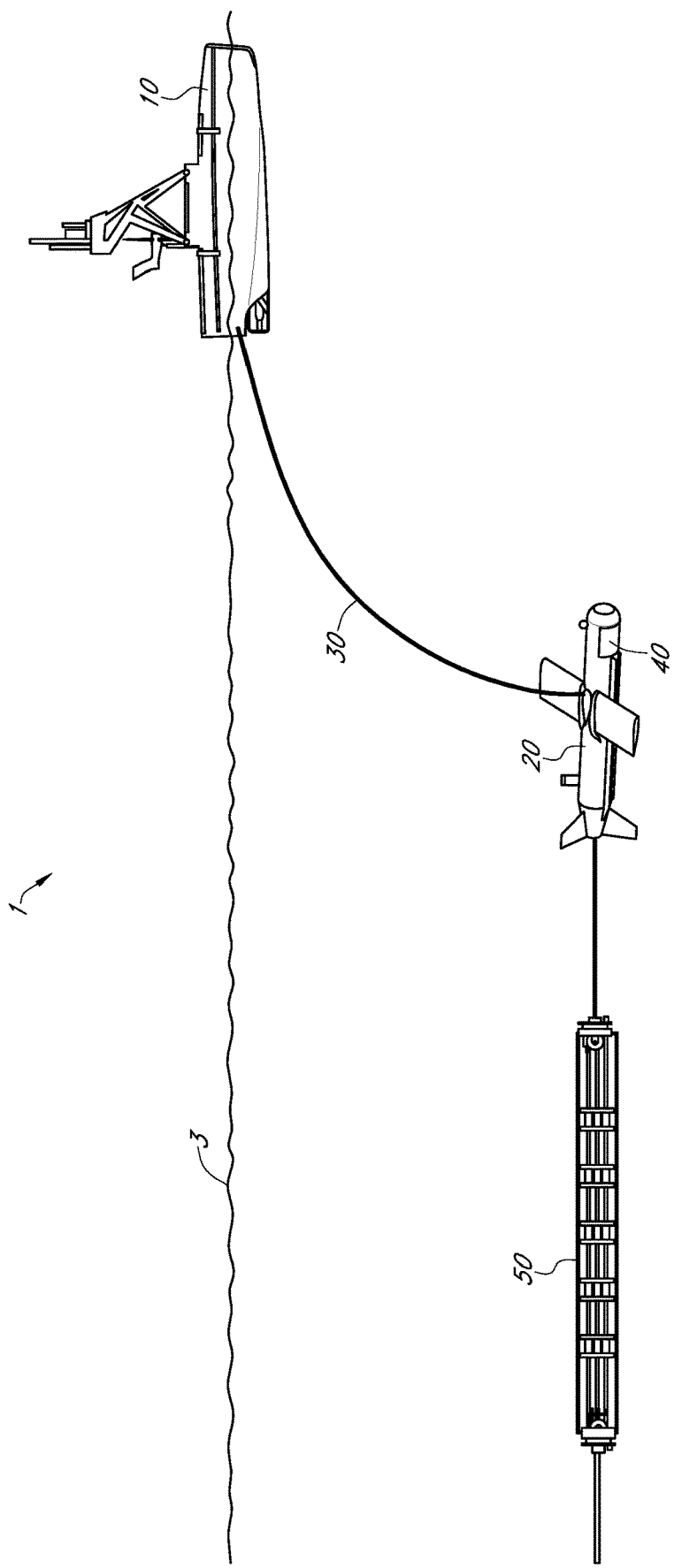
FIG. 1 is a schematic diagram of a sonar-based sensing system according to some embodiments of the present disclosure.
Figure 2:
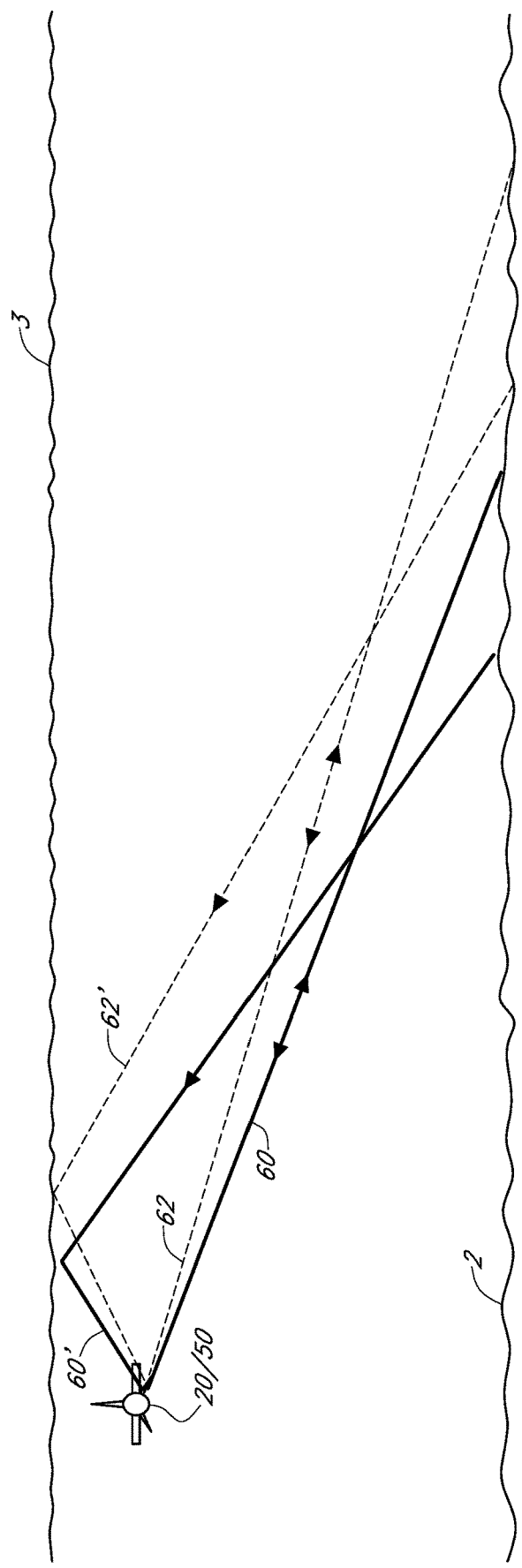
FIG. 2 illustrates return signals from different points along the seabed, which reflect off the water surface and reach the sonar-based sensing system, according to some examples.

FIG. 1 is a schematic diagram of a sonar-based sensing system 1 according to some embodiments of the present disclosure. FIG. 2 illustrates return signals from different points along the seabed 2, which reflect off the water surface 3 and reach the sonar-based sensing system 1, according to some examples. As used herein the term "seabed" refers to the sea floor or ocean floor.

According to some embodiments, the sonar-based sensing system (also referred to as a survey system) 1 includes surface vehicle (also referred to as a launch and recovery vehicle) 10, such as a ship or boat, which could be manned or autonomously operated; a tow body (e.g., an active depth-keeping tow body) 20 coupled to (e.g., is towed by)

the surface vehicle 10 via a towing cable 30 and including a transmitter 40 (also referred as a projector) for generating pulsed acoustic signals emitted from the sides of a tow body 20; and a receiver 50 coupled to (e.g., towed by) the tow body 22, and configured to receive return signals (e.g., reflected acoustic signal) of the transmitted signal. In some embodiments, the receiver 50 includes a triplet element of hydrophones configured to form a cardioid null in a desired direction to cancel or substantially reduce the intensity of return signals reflecting from the surface of the water.

According to some examples, the tow body 20 may be an active depth keeping device deployed at a depth of about 150 m to about 350 m (e.g., about 250 m) and may be towed at a speed of about 10 knots to about 15 knots (e.g., about 12 knots). The receiver 50 may have a seabed swath of about 7700 m and the sonar-based sensing system 1 may be capable of covering more than 4000 km² per day.

As illustrated in FIG. 2, operating the sonar-based sensing system 1 near the surface of water may presents a challenge as the surface of the ocean (i.e., the water-air interface) may act as a near perfect mirror that can generate a phase scrambled version of the image from an adjacent piece of seabed in the same range instant. This may be due to the fact that, at any given time, for every direct path of return of the emitted signal (as, e.g., represented by paths 60 and 62 in FIG. 2), there is a corresponding indirect path (as, e.g., represented by paths 60' and 62' in FIG. 2) of the same length by which a return signal from a nearby point along the seabed 2 reflects off the water surface 3 and returns to the receiver 50 at about the same time. If not nullified, the indirect return signals may destroy coherence and make synthetic aperture sonar impossible or very difficult. However, according to some embodiments, the receiver 50 utilizes triplet elements capable of nullifying or substantially nullifying the effect of the surface-reflected return signal, thus improving signal-to-noise ration of the detected return signal and improving detection resolution.

Figure 3B:
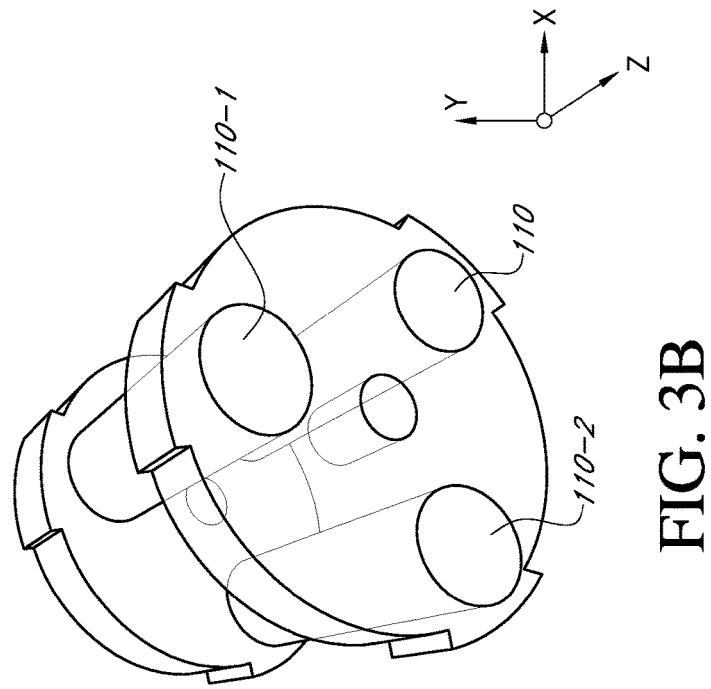
FIGS. 3A-3B respectively illustrate a side view and a perspective view of a triplet element of the sonar-based sensing system, according to some embodiments of the present disclosure.
Figure 3C:
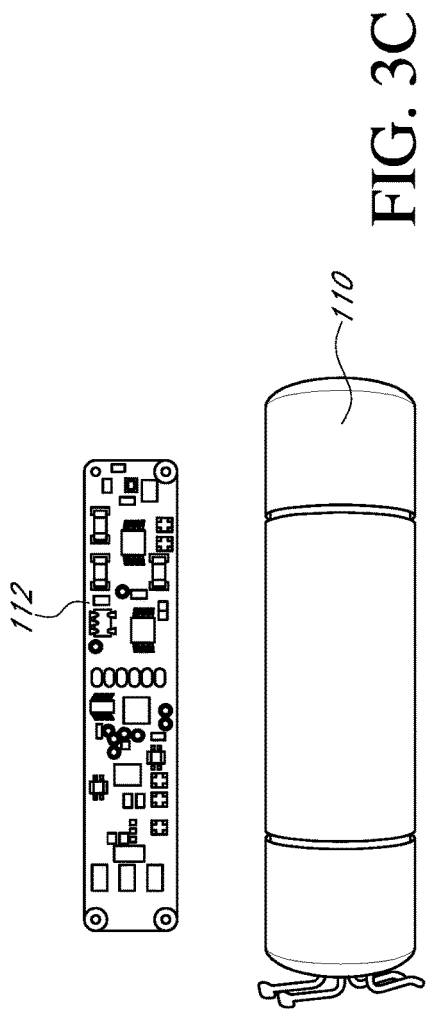
FIG. 3C illustrates a side view of telemetry electronics and a shell constituting a hydrophone of the triplet element, according to some embodiments of the present disclosure.
Figure 3A:
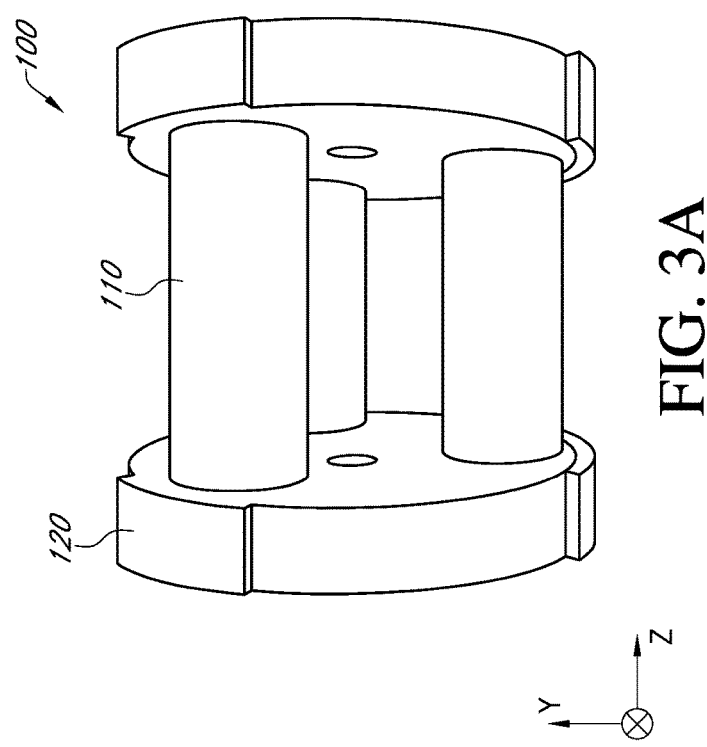

FIGS. 3A-3B respectively illustrate a side view and a perspective view of the triplet element 100, according to some embodiments of the present disclosure. FIG. 3C illustrates a side view of telemetry electronics 112 and the shell 114 constituting a hydrophone 110 of the triplet element 100, according to some embodiments of the present disclosure.

According to some embodiments, the triplet element 100 includes three hydrophones 110 that are organized axially (e.g., positioned along the circumference of a circle). In some embodiments, the three hydrophones 110 are spaced at equal intervals (e.g., 120 degrees apart); however, embodiments of the present disclosure are not limited thereto, and the three hydrophones 110 may be spaced at unequal intervals. The three hydrophones 110 may be coupled together (e.g., fixedly coupled together) by a pair of couplers 120 at each end of the trio. In some examples, the three hydrophones (i.e., the first to third hydrophones 110, 110-1, and 110-2) may be identical or substantially identical.

The hydrophone 110 may detect sounds under water by converting received acoustic energy into electrical energy. The hydrophone 110 includes digitization and telemetry electronics 112 encased in a shell 114. The shells 114 of the hydrophones 110 may be cylindrical in shape, and may extend parallel to one another along the direction of tow. The shell 114, which may be made of ceramic (e.g., a lead zirconium titanate (PZT) ceramic) or any other suitable piezo-restrictive material, may be configured as a pressure housing and, in some embodiments, as a transducer (e.g., a piezoelectric transducer) that generates an electric potential when experiencing a pressure change (e.g., resulting from sound waves under water). The digitization and telemetry electronics 112 is configured to convert the electrical potentials from the shell 114 into digital signals for further processing. The hydrophone 110 may be configured to match the acoustic impedance of water.

According to some embodiments, while each hydrophone 110 is omni-directional (i.e., is capable of receiving signal from different direction with equal or substantially the same sensitivity), the triplet element 100 is capable of exhibiting directionality (i.e., can exhibit varying levels of sensitivity based on angle of incidence). This is due to the fact that the relative position of the three hydrophones results in a relative time delay between when each of the hydrophones 110 receives the incoming signal, which translates to a relative phase shift of the signal being received. In some embodiments, a signal processor of the sonar-based sensing system 1 (also referred to as a processor, null steerer, or beam former) amplifies the signals received by the three hydrophones differently to achieve destructive interference (or a null) at a desired angle. This allows the receiver 50 to ignore or reject noise in a one particular direction (e.g., to reject/ignore a surface-reflected acoustic signal), while listening for (i.e., receive without nullifying/rejecting) incoming signal from other directions. In some embodiments, a triplet radius of less than or equal to $\lambda/6$, where $\lambda$ represents the wavelength of the signal generated by the transmitter 40, allows for the formation of a cardioid response (e.g., a cardioid null) at an arbitrary look angle. The sensitivity of the receiver 50 increases the closer the triplet radius is to $\lambda/6$. At radiuses greater than $\lambda/6$, other nulls may appear in the cardioid, and thus the receiver response may not be as desired. In some examples, the triplet radius may be about 10 mm to about 30 mm.

Figure 4A:
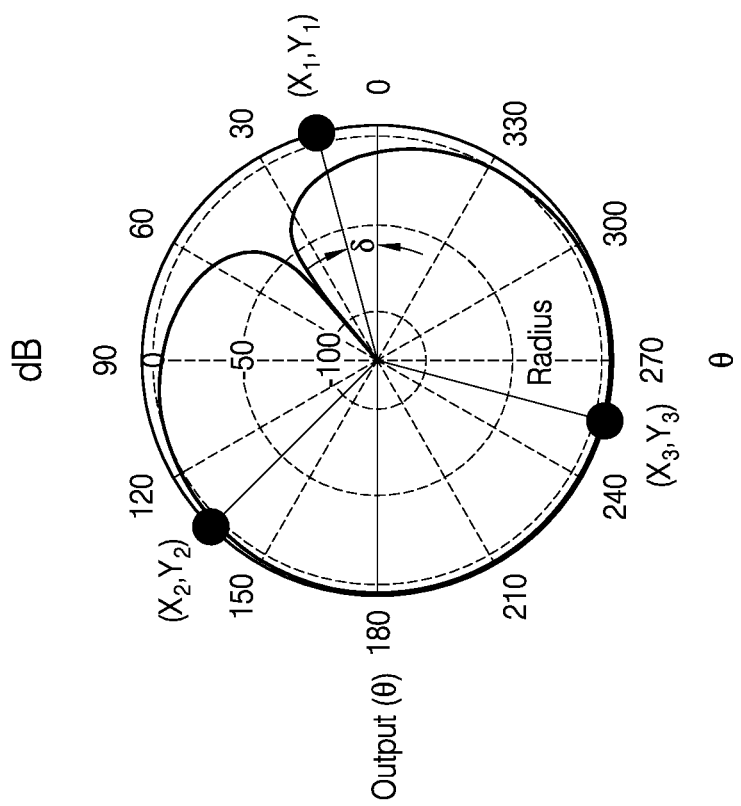
FIG. 4A illustrates an example of the cardioid response of a receiver of the sonar-based sensing system, according to some embodiments of the present disclosure.
Figure 4B:
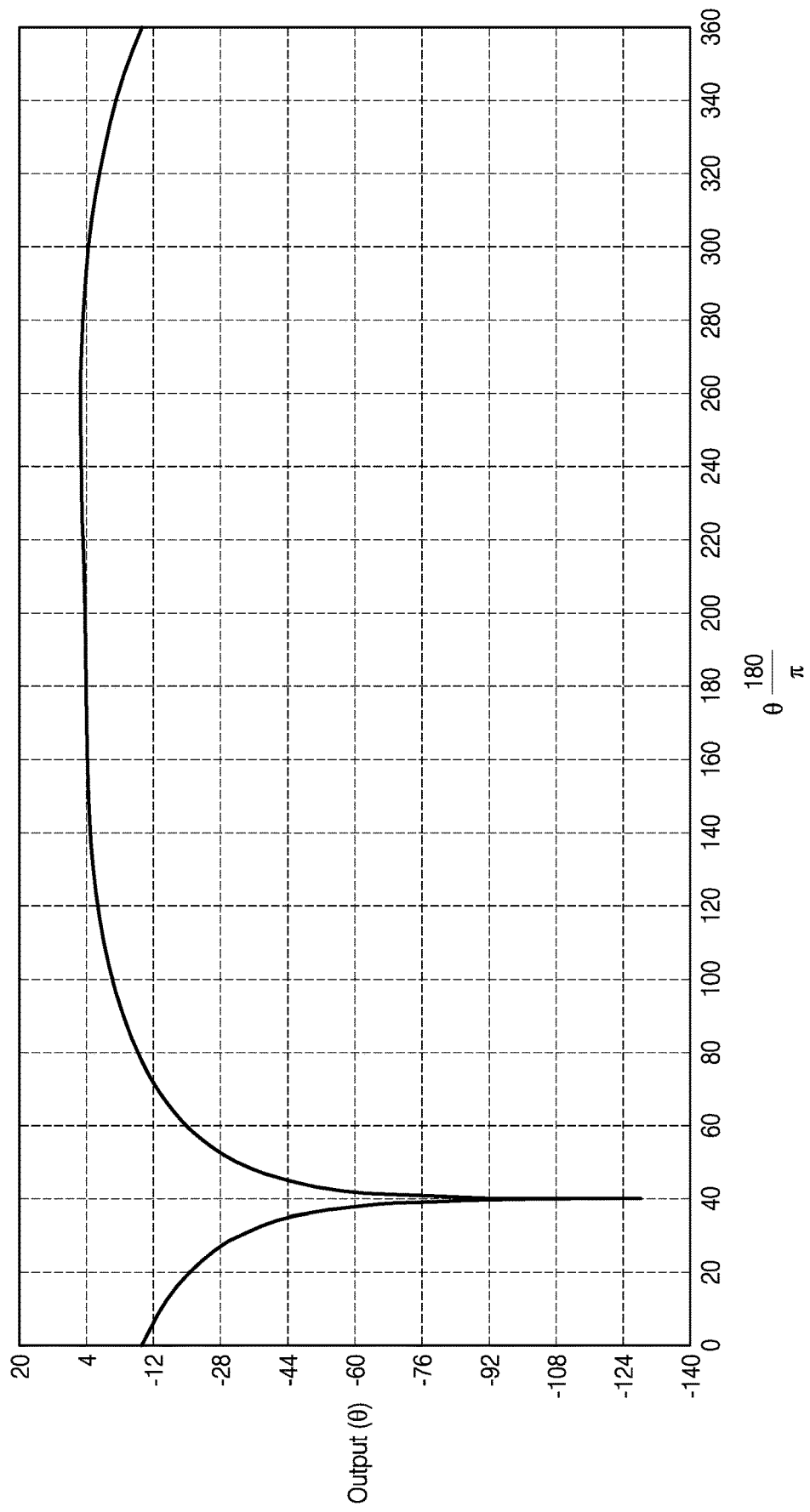
FIG. 4B illustrates the intensity of the output of the receiver as a function of incidence angle of the incoming signal, according to some embodiments of the present disclosure.
Figure 5:
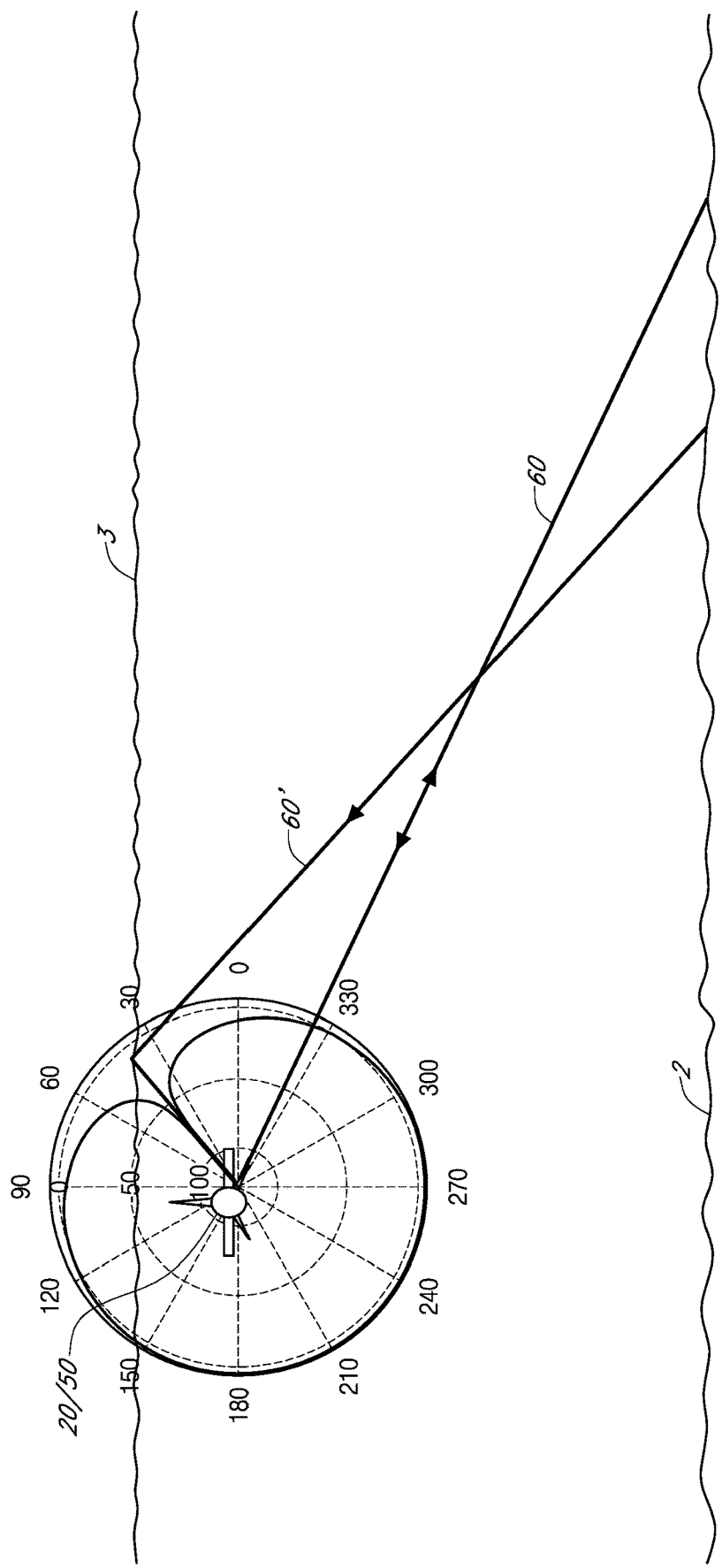
FIG. 5 illustrates the capability of the sonar-based sensing system to create a cardioid null to cancel or substantially reduce surface noise, according to some embodiments of the present disclosure.

FIG. 4A illustrates an example of the cardioid response of the receiver 50, according to some embodiments of the present disclosure. FIG. 4B illustrates the intensity of the output of the receiver 50 as a function of incidence angle of the incoming signal, according to some embodiments of the present disclosure. FIG. 5 illustrates the capability of the sonar-based sensing system 1 to create a cardioid null to cancel or substantially reduce surface noise, according to some embodiments of the present disclosure.

Referring to FIG. 4A, the logarithmic output response of the triplet element 100 may be expressed as a function of the incidence angle $\theta$ of the signal being received by the triplet element 100 by Equation (1):

$$\text{Output}(\theta) := 20 \cdot \log \left\| \sum_{n=1}^{3} \left[ \text{Phasor}(X_n, Y_n, \theta) \cdot \alpha_n \cdot e^{\frac{-2\pi \cdot i}{\lambda} \cdot (c\tau_n)} \right] \right\| \quad \text{Eq. (1)}$$

where Phasor represents the intensity of the signal received by each of the three hydrophones, $X_n$ and $Y_n$ represent the cartesian coordinates of each of the three hydrophones 110 of the triplet element 100 in a cross-plane (e.g., X-Y plane) orthogonal to the extension direction of the hydrophones 110 (e.g., the Z axis), the incidence angle $\theta$ is the radial angle in the cross-plane represented by the cartesian coordinates, and $$\text{Phasor}(x, y, \theta) := e^{\frac{2\pi i}{\lambda} \cdot [(x \cdot \cos(\theta)) + (y \cdot \sin(\theta))]} \quad \text{Eq. (2)}$$

represents the null-rotating term that can steer the null in a desired direction. For ease of illustration, the cardioid response in FIG. 4A is superimposed with the position of the three hydrophones 110 in the cross-plane.

Here, intensity of the hydrophone-received signal Phasor, which is a function of position of the hydrophone and the incidence angle of the received signal (e.g., the returned acoustic signal 60 or 60') may be expressed by Equation (2):

$$\alpha_n \cdot e^{\frac{-2\pi \cdot i}{\lambda} \cdot (c\tau_n)}$$

where $\lambda$ represents the wavelength of the incoming signal (e.g., wavelength of the return signal 60 or 60'). In some examples, $\lambda$ may be defined as the speed of sound at the depth of the triplet element 100 divided by the frequency of the return acoustic signal (which may be the same as the frequency of the transmitted signal). The position coordinates of the first to third hydrophones 110, 110-1, and 110-2 that are represented as $(X_1, Y_1)$, $(X_2, Y_2)$, and $(X_3, Y_3)$ can be expressed through Equations (3)-(8):

$$X_1 := \text{Radius} \cdot \cos(\delta) \quad \text{Eq. (3)}$$

$$Y_1 := \text{Radius} \cdot \sin(\delta) \quad \text{Eq. (4)}$$

$$X_2 := \text{Radius} \cdot \cos\left(\delta + \frac{2\pi}{3}\right) \quad \text{Eq. (5)}$$

$$Y_2 := \text{Radius} \cdot \sin\left(\delta + \frac{2\pi}{3}\right) \quad \text{Eq. (6)}$$

$$X_3 := \text{Radius} \cdot \cos\left(\delta - \frac{2\pi}{3}\right) \quad \text{Eq. (7)}$$

$$Y_3 := \text{Radius} \cdot \sin\left(\delta - \frac{2\pi}{3}\right) \quad \text{Eq. (8)}$$

where Radius is the radius of the triplet element, $\delta$ represents the angular offset of the triplet element 100 (e.g., the angular offset of the first hydrophone 110) expressed in radians. In Equations (3)-(8), it is assumed that the three hydrophones 110 to 110-2 are equally spaced at angular intervals of 120 degree or $$\frac{2\pi}{3}$$

radians.

In the null-rotating term $$\alpha_n \cdot e^{\frac{-2\pi \cdot i}{\lambda} \cdot (c\tau_n)},$$

the parameters $\alpha_n$ and $c\tau_n$ for each of the hydrophones may be expressed by the following equations:

$$\alpha_1 := \sin(\beta) \quad \text{Eq. (9)}$$

$$c\tau_1 := \text{Radius} \cdot \sin(\beta) \quad \text{Eq. (10)}$$

$$\alpha_2 := \sin\left(\beta + \frac{2\pi}{3}\right) \quad \text{Eq. (11)}$$

$$c\tau_2 := \text{Radius} \cdot \sin\left(\beta + \frac{2\pi}{3}\right) \quad \text{Eq. (12)}$$

$$\alpha_3 := \sin\left(\beta - \frac{2\pi}{3}\right) \quad \text{Eq. (13)}$$

$$c\tau_3 := \text{Radius} \cdot \sin\left(\beta - \frac{2\pi}{3}\right) \quad \text{Eq. (14)}$$

Where $\beta$ represents the angular location of the null generated by the triplet element 100. In the example of FIGS. 4A-4B, $\beta$ is at about 50 degree or about $$50 \cdot \frac{\pi}{180}$$

radians. In the example of FIG. 4B, the y-axis of the graph is in dBs.

Thus, the output response of the receiver 50 may be calculated as a complex weighted summation of intensities of signals received at the first to third hydrophones 100 to 100-2, wherein weights of the weighted summation are based on the radius of the triplet element 100 and an angular location of the cardioid null generated by the receiver.

According to some embodiments, the sonar-based sensing system 1 (e.g., a signal processor of the sonar-based sensing system 1) can calculate the angle of incidence of the water-surface-reflected signal 60'/62' based on the depth of the triplet element 100 (which, e.g., may be the same as the depth of the tow body 20), the water column depth (i.e., a height of the water column corresponding to the location of the triplet element 100 from seabed 2 to water surface 3), and the timing of the signal transmission. Once the angle of incidence of the water-surface-reflected signal 60'/62' is determined, the sonar-based sensing system 1 (e.g., the signal processor of the sonar-based sensing system 1) sets the value $\beta$ equal to the calculated incidence angle of the surface-reflected signal. As noted above, in some embodiments, the determination of the incidence angle of the surface-reflected signal by the sonar-based sensing system 1 and the resultant null steering is time dependent (e.g., is based on the amount of time passed since the latest transmission by the transmitter 40). This is because as more time passes, the signal transmitted by the transmitter 40 can reach further distances of the seabed and the return signal is further delayed. Therefore, as illustrated in FIG. 2, at a first time, the sonar-based sensing system 1 (e.g., the signal processor) is configured to determine a first incidence direction of the incoming signal (see e.g., the angle of the return path 60' in FIG. 2), and at a second time (e.g., a later time), the sonar-based sensing system 1 (e.g., the signal processor) is configured to determine a second incidence direction of the incoming signal (see e.g., the angle of the return path 62' in FIG. 2) and to steer the cardioid null from the first incidence direction to the second incidence direction to reject the incoming signal over time.

Thus, as described above and as shown in FIGS. 2 and 5B, the triplet element 100 can steer the null in the direction of the surface-reflected signal to reduce (e.g., minimize the dominant source of interference, which is the surface-reflected signal. In some examples, the receiver 50 can attenuate the surface-reflected signal by more than 20 dB, thus effectively cancelling/rejecting surface noise, and can achieve a signal-to-noise ratio (SNR) of greater than 14 dB.

In some embodiments, the steer angle is seeded with a geometric approximation (e.g., estimated water column depth and tow depth), and then optimized with a maximum coherence cost search to correct for unknown acoustic path characteristics.

According to some embodiments, the receiver 50 include a plurality of triplet elements 100 organized in array form along the tow direction (e.g., along the Z-axis), which allows for improved directional signal reception. For example, the receiver 50 may include an array of hundreds to thousands of triplet elements 100. In some embodiments, the receiver array 50 may be divided into a plurality of modules, each including a plurality of triplet elements 100. In some examples, the receiver array 50 may include 480 modules, where each of the modules includes 5 triplet elements 100.

Figure 6:
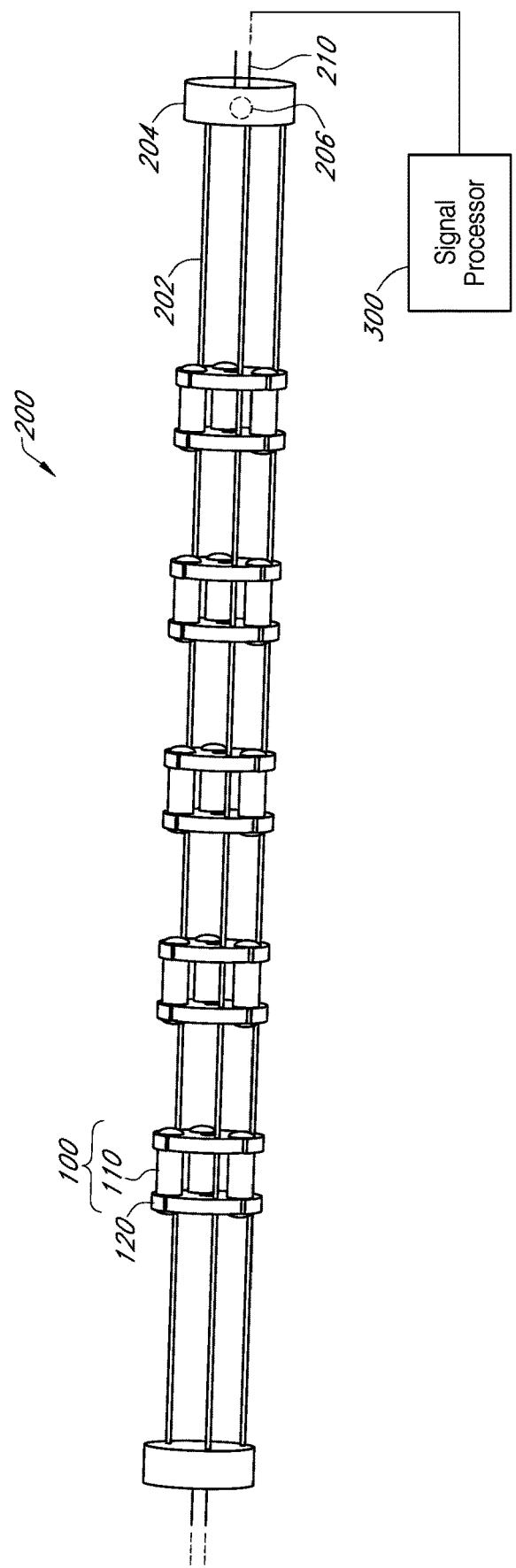
FIG. 6 illustrates a module of the receiver, according to some embodiments of the present disclosure.

FIG. 6 illustrates a module 200 of a receiver 50, according to some embodiments of the present disclosure.

Referring to FIG. 6, according to some embodiments, the module 200 of the receiver array 50 includes a plurality of triplet elements 100 that are coupled together along the length of the triplet element 100 (e.g., along the Z-axis) and may be attached together by a plurality of rods 202 and held together at each end of the module 200 by a bulkhead 204. The different modules 200 may be physically and electrically coupled to one another and the tow body 20 via a cable 210.

In some embodiments, the bulkhead 204 includes attachment mechanisms for attaching to the rods 202 and securing them together, and electronic circuitry 206 that combine (e.g., sum) together the signals received from corresponding one of the hydrophones 110 from each of the triplet elements 100 to generate three electrical outputs. In other words, the electronic circuitry 206 of the bulkhead 204 may sum together the signals from the first hydrophones 110 to generate a first electrical output, sum together the signals from the second hydrophones 110-1 to generate a second electrical output, and sum together the signals from the third hydrophones 110-2 to generate a third electrical output. In some embodiments, the electronic circuitry 206 converts the three electrical signals to optical signals that are multiplexed onto an optical fiber in the cable 210 using different wavelengths (e.g., different colors) of light. However, embodiments of the present disclosure are not limited thereto, and the electrical outputs of each module 200 may be transmitted electrically along the cable 210. The cable 210 transmits the output signals from each module 200 to a signal processor 300 for further processing.

According to some embodiments, the signal processor (also referred to as a processor, null steerer, or beam former) 300 is configured to determine an incidence direction of the incoming signal, and to dynamically generate a cardioid null in the incidence direction to reject the incoming signal based on the output signals from each of the modules 200. The signal processor 300 may be incorporated into or implemented in any suitable device. For example, the signal processor 300 may be incorporated into a bulkhead 204 of a module 200, the tow body 20, the surface vehicle 10, or an external location that receives the outputs of the receiver 50.

Grouping the triplet elements 100 of the receiver array 50 into fewer modules 200 reduces the number of electronic circuitry 206 used in the receiver, which can lower power usage and overall system cost. However, because the azimuth resolution of the module 200 may be about one half of the length of the module 200, the number of triplet elements 100 contained in one module 200 may be limited by the desired resolution. In some examples, the length of each module 200 may be about 0.5 m, and the entire receiver array 50 may be hundreds of meters long. In some examples, the minimum 3 dB width of a resolution cell, which may be obtained, may not be less than one half of the length of the receiver element.

As described herein, the sonar-based sensor system according to some embodiments of the present disclosure is capable of generate and dynamically steer a cardioid null and thus cancel or substantially reduce surface noise. The surface noise cancelation improves SNR and imaging resolution of the sensor system. As a result, the sonar-based sensor system according to some examples is capable of obtaining an 8 to 1 improvement in coverage area with 4 times the forward advance as compared to solutions of the related art.

As described above, unlike solutions of the related art that either sacrifice spectral performance or power efficiency, or induce significant transmitter processing complexity, the communication system according to some embodiments achieves high capacity constellations generated in the receiver with improved combined spreading gain/spectral efficiency without relying on high-power, and low efficiency linear amplifiers.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

The sensor system devices and/or any other relevant devices or components according to embodiments of the present disclosure described herein, such as the processor, the electronic circuitry of the receiver, and the telemetry electronics of the hydrophone, may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

While the present invention has been illustrated and described with reference to the embodiments thereof, it will be apparent to those of ordinary skill in the art that various suitable changes in form and detail may be formed thereto without departing from the spirit and scope of the present invention, as defined by the following claims and equivalents thereof.

What is claimed is:

1. A sensor system comprising:
a triplet element comprising a first hydrophone, a second hydrophone, and a third hydrophone configured to receive an incoming signal at a first phase, a second phase, and a third phase, respectively, the first to third hydrophones extending along a first direction; and
a processor configured to determine an incidence direction of the incoming signal, and to dynamically generate a cardioid null in the incidence direction to reject the incoming signal based on the incoming signal at the first to third phases, the processor being further configured to determine an incidence direction of the incoming signal based on a depth of the triplet element, a water column depth, and a timing of transmission of a signal being reflected back from a seabed and a water surface as the incoming signal.

2. The sensor system of claim 1, wherein the processor is configured to receive, without nullifying, other signals from directions different from the incidence direction of the incoming signal, the other signals being received by the triplet element at a same time as the incoming signal.

3. The sensor system of claim 1, wherein the first phase is different from the second phase.

4. The sensor system of claim 1, wherein the incoming signal is a surface reflection of an acoustic signal off of a seabed.

5. The sensor system of claim 1, wherein one end of each of the hydrophones is positioned along a circumference of a circle.

6. The sensor system of claim 5, wherein the first to third hydrophones are spaced at equal intervals.

7. The sensor system of claim 5, wherein a radius of the circle is less than or equal to 1/6 of a wavelength of the incoming signal.

8. The sensor system of claim 1, wherein the processor is further configured to determine a first incidence direction of the incoming signal at a first time, to determine a second incidence direction of the incoming signal at a second time, and to steer the cardioid null from the first incidence direction to the second incidence direction to reject the incoming signal over time.

9. A sensor system comprising:
a triplet element comprising a first hydrophone, a second hydrophone, and a third hydrophone configured to receive an incoming signal at a first phase, a second phase, and a third phase, respectively, the first to third hydrophones extending along a first direction; and
a processor configured to determine an incidence direction of the incoming signal, and to dynamically generate a cardioid null in the incidence direction to reject the incoming signal based on the incoming signal at the first to third phases, wherein the processor is further configured to calculate an output response of the sensor system as a weighted summation of intensities of signals received at the first to third hydrophones, wherein weights of the weighted summation are based on a radius of the triplet element and an angular location of the cardioid null generated by the sensor system.

10. The sensor system of claim 1, wherein the processor is further configured to calculate an output response of the sensor system as:

$$\text{Output}(\theta) := 20 \cdot \log \left\| \sum_{n=1}^{3} \left[ \text{Phasor}(X_n, Y_n, \theta) \cdot \alpha_n \cdot e^{\frac{-2\pi \cdot i}{\lambda} \cdot (c\tau_n)} \right] \right\|$$

where $\theta$ represents an incidence angle of the incoming signal, Phasor represents a signal seen by each of the hydrophones, $X_n$ and $Y_n$ represent coordinates of each of the hydrophones of the triplet element in a cross-plane orthogonal to the first direction, and $$\alpha_n \cdot e^{\frac{-2\pi \cdot i}{\lambda} \cdot (c\tau_n)}$$

represents a null-rotating term for steering the null in a particular direction.

11. The sensor system of claim 10, wherein the Phasor is expressed by:

$$\text{Phasor}(x, y, \theta) := e^{\frac{2\pi \cdot i}{\lambda} \cdot [(x \cdot \cos(\theta)) + (y \cdot \sin(\theta))]}$$

where x and y represent coordinates of a corresponding one of the hydrophones and $\lambda$ represents a speed of sound at a water depth of the triplet element.

12. The sensor system of claim 10, wherein in the null-rotating term, $$\alpha_n \cdot e^{\frac{-2\pi \cdot i}{\lambda} \cdot (c\tau_n)},$$

$\alpha_n$ and $c\tau_n$ are based on an angular location of a null generated by the sensor system, and $\lambda$ represents the speed of sound at a water depth of the triplet element.

13. A sensor system comprising:
a plurality of triplet elements coupled together along a first direction, a triplet element of the plurality of triplet elements comprising a first hydrophone, a second hydrophone, and a third hydrophone configured to receive an incoming signal at a first phase, a second phase, and a third phase, respectively, the first to third hydrophones extending along a first direction; and
a processor configured to determine an incidence direction of the incoming signal, and to dynamically generate a cardioid null in the incidence direction to reject the incoming signal based on the incoming signal at the first to third phases, the processor being further configured to determine an incidence direction of the incoming signal based on a depth of the triplet element, a water column depth, and a timing of transmission of a signal being reflected back from a seabed and a water surface as the incoming signal.

14. The sensor system of claim 13, wherein the sensor system is configured to be towed by a tow body at a particular depth below a water surface, the tow body being towed by a surface vehicle.

15. The sensor system of claim 14, wherein the tow body comprises a transmitter configured to generate a pulsed acoustic signal emitted from sides of the tow body, and
wherein the incoming signal is a reflection of the pulsed acoustic signal from a seabed and a water surface.

16. The sensor system of claim 13, wherein the first to third hydrophones are spaced at equal intervals.

17. The sensor system of claim 13, wherein a radius of the triplet element is less than or equal to ⅙ of a wavelength of the incoming signal.

18. The sensor system of claim 13, wherein the processor is configured to determine a first incidence direction of the incoming signal at a first time, to determine a second incidence direction of the incoming signal at a second time, and to steer the cardioid null from the first incidence direction to the second incidence direction to reject the incoming signal over time.

\* \* \* \* \*